Nov. 30, 1965    C. L. JULIAN ETAL    3,220,395
DISTRIBUTOR HAVING ADVANCE AND RETARD CONTROL
Filed March 23, 1964    2 Sheets-Sheet 1
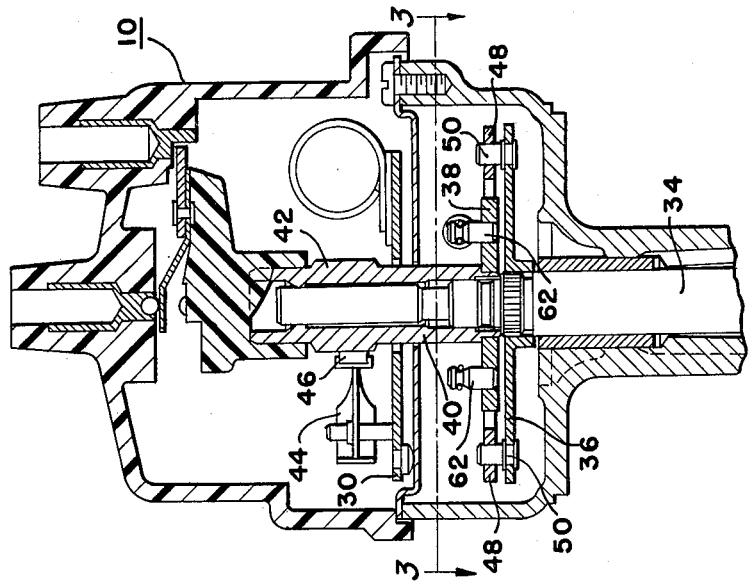
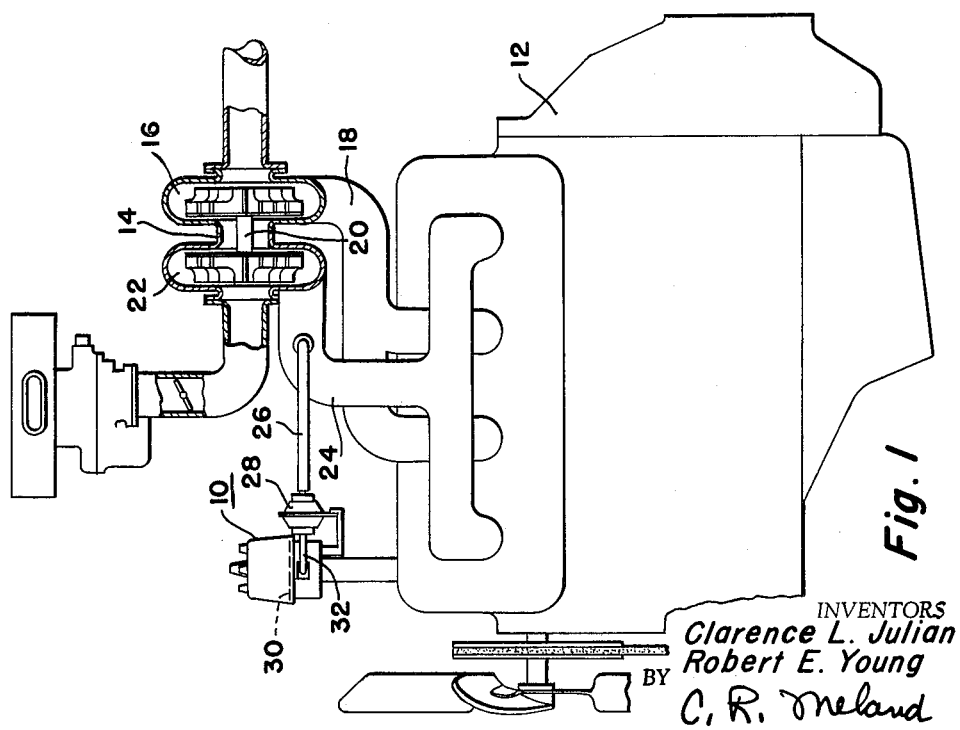
INVENTORS
Clarence L. Julian
Robert E. Young
BY C. R. Meland
Their Attorney

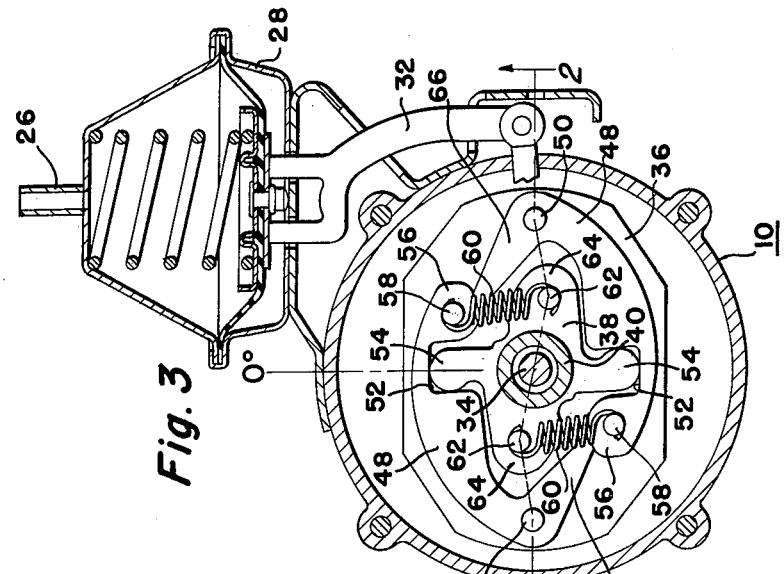
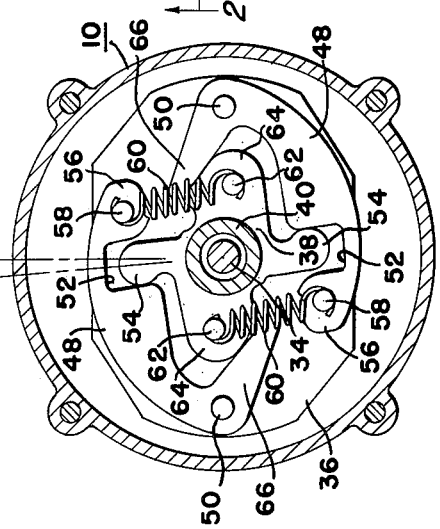
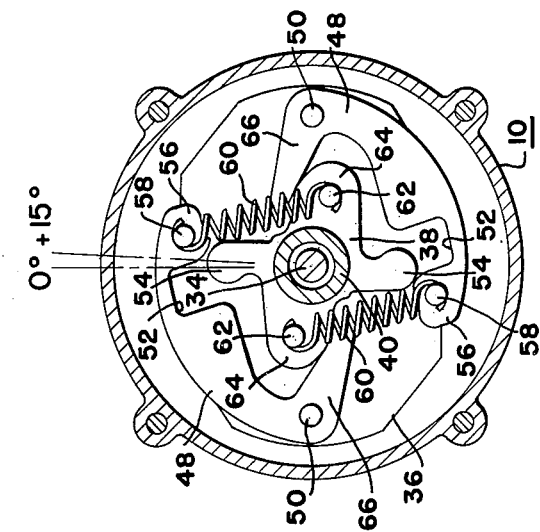
INVENTORS
Clarence L. Julian
Robert E. Young
BY C. R. Meland
Their Attorney United States Patent Office 3,220,395
Patented Nov. 30, 1965

3,220,395
DISTRIBUTOR HAVING ADVANCE AND
RETARD CONTROL
Clarence L. Julian, Middletown, and Robert E. Young,
Anderson, Ind., assignors to General Motors Corporation, Detroit, Mich., a corporation of Delaware
Filed Mar. 23, 1964, Ser. No. 353,884
3 Claims. (Cl. 123—146.5)

This invention relates to ignition timing devices and more particularly to an ignition timing control for supercharged engines that will first retard and later advance the ignition spark by centrifugal means.

In the operation of internal combustion engines that are aspirated by an exhaust driven supercharger, a problem of ignition timing in a detonation range is prominent. In some range of increasing engine speeds, an exhaust driven supercharger reaches a point of maximum efficiency. The construction of most commonly designed exhaust driven superchargers and the need for increased performance in low engine speed ranges results in this detonation range occurring somewhere between 1500 and 3500 r.p.m. At an increased engine speed, when the exhaust driven supercharger is operating most efficiently, a maximum compaction of the molecules of a fuel-air mixture in the combustion chamber results; where, in the operation of normally aspirated engines, an increasing engine speed will result in a less dense combustible mixture. This more dense combustible mixture has a tendency to ignite by compression alone and results in a violent explosion in a combustion chamber instead of a smoothly advancing flame front. This range of engine speeds in which the dense combustible mixture sometimes explodes is commonly called a detonation range.

One remedy for detonation is a retardation of the spark. A non-supercharged internal combustion engine requires a steadily advancing spark during an increasing engine speed. Normally, this constantly advancing spark is brought about by a vacuum advance during increasing engine speeds up to approximately 2000 r.p.m. and, thereafter, the ignition spark advance is mainly provided by centrifugal means. In a supercharged engine, it therefore becomes desirable to retard the ignition spark after a certain amount of spark advance has taken place, this retardation corresponding to the range of speeds in which detonation is likely to occur. As the engine speed increases above this detonation range, it becomes desirable to again advance the ignition spark.

It is an object of the present invention to provide an improved spark control device that will retard the ignition spark after a certain amount of advance has taken place and will later resume the advancing sequence.

It is another object of the present invention to provide an improved device of the type before described which will function in conjunction with a distributor of common design.

It is still another object of the present invention to provide a device responsive to centrifugal force which will first allow a spark retardation and, as engine speed increases further, will advance the ignition spark.

It is a further object of the present invention to provide an ignition control device which first retards and later advances the ignition spark, said device being adapted to retard the spark during a detonation range a varying amount for engine superchargers of different design having a different range of speeds during which detonation is likely to occur.

Further objects and advantages of the present invention will be apparent from the following description, reference being had to the accompanying drawings wherein a preferred embodiment of the present invention is clearly shown.

In the drawings:
FIGURE 1 is a side elevation with parts broken away of an internal combustion engine having an exhaust driven supercharger;
FIGURE 2 is a sectional view taken of the distributor of FIGURE 3;
FIGURE 3 is a sectional view taken along line 3—3 of FIGURE 2 showing the invention in a configuration it would assume at the beginning of a detonation range;
FIGURE 4 is a sectional view taken along line 3—3 of FIGURE 2 showing the invention in a configuration it would assume during a detonation range;
FIGURE 5 is a sectional view taken along line 3—3 of FIGURE 2 showing the invention in a configuration it would assume after the detonation range at an increased engine r.p.m.

Referring now to FIGURE 1, a distributor 10 is shown mounted on an internal combustion engine 12 and is gear driven thereby in any well-known manner. A supercharger 14 is illustrated with a driving portion 16 situated in an exhaust manifold 18. A shaft 20 connects the driving portion 16 with a driven portion 22 situated in an intake manifold 24. A vacuum line 26 is tapped into the intake manifold 24 on one end and is attached to a vacuum control unit 28 on another end. The vacuum control unit 28 engages a breaker mounting plate 30 through a link 32.

Referring now to FIGURE 2, a distributor drive shaft 34 is rotatably mounted in the distributor 10. A cam plate 36 is carried by the distributor drive shaft 34 and arranged to rotate therewith. A cam 38 is rotatably carried on the distributor drive shaft 34 at a point above the cam plate 36. A sleeve 40 carrying a breaker cam 42 is firmly mounted on the cam 38 and adapted to rotate therewith. A set of breaker points 44 is carried on the breaker mounting plate 30 and includes a rubbing block 46 arranged to bear against the breaker cam 42 to provide an opening and closing means for the breaker points in a sequential manner during operation of the engine 12.

Referring now to FIGURE 3, a series of weights 48 are pivotally mounted on the cam plate 36 at points 50. Each of the weights 48 has a slot 52 arranged to cooperate with one of a pair of outwardly projecting lobes 54 of the cam 38. Portions 56 of the weights 48 furthest removed from the pivot point 50 have upwardly extending pins 58 engaging one end of the springs 60. A pair of pins 62 carried on a series of lugs 64 of the cam 38 engage the springs 60 on its other end to provide a biased engagement between the cam 38 and the weights 48.

For purposes of explaining the operation of the subject device, it will be assumed that the engine driven supercharger on the internal combustion engine on which the invention is mounted has a detonation range of approximately 2000 to 3000 r.p.m. It is understood that any designed supercharger could have a different range of maximum efficiency and the device would function equally as well in that application.

In operation, the engine illustrated in FIGURE 1 would be started and steadily accelerated. As the engine speed increased from idle, the vacuum control unit 28, being responsive to engine vacuum through the vacuum line 26, would draw the breaker mounting plate 30 in one direction relative to the breaker cam 42 through the link 32. As the engine speed increased to approximately 1500 r.p.m., the breaker mounting plate 30 would be driven continually around the breaker cam 42 to bring about a constantly increasingly ignition spark advance. At approximately 1500 r.p.m., as engine vacuum decreases with increasing speed, the vacuum control unit 28 would become decreasingly effective and would allow the breaker mounting plate 30 to move in the opposite direction around the breaker cam 42 resulting in a loss of the spark advance brought about during the lower range of engine speeds.

It will be assumed in the example given that the vacuum control unit 28 has ceased to be effective as a spark advance device at approximately 2000 r.p.m.

Referring now to FIGURE 3, the weights 48 and the cam 38 would assume the configuration illustrated herein in which no spark advance is provided by the vacuum control unit 28 and no spark advance or retard is provided by the present invention.

As the engine r.p.m. increases above approximately 2000 r.p.m., the vacuum control unit continues to be ineffective in providing any advance or retard and the r.p.m. has now increased to a point where the pivotable weights 48 begin to pivot outwardly more forcibly due to centrifugal force generated therein by the more rapidly rotating cam plate 36.

Referring now to FIGURE 4, the weights 48 have begun to swing outwardly toward the outer wall of the distributor 10. During the initial portion of the movement of the weights 48 outwardly, the slots 52 begin to disengage from the lobes 54 of the cam 38. The slot 52 moves in an arcuate path away from the center line of the cam lobes 54 which corresponds to the line 0°, referenced to the shaft 34, as illustrated in FIGURE 3. The slots 52 moving in an arcuate path allow the cam lobes 54 to travel in the same direction in an arcuate path as the slots 52 travel. This movement, in the example given, will be about 9° in a counterclockwise fashion and is illustrated in FIGURE 4. It is understood that the configuration shown in FIGURE 4 is not at full retard but progressing toward a point where 9° retard is had. The reference line —9° is illustrative of direction only, not dimension. This movement of the lobes 54 is restricted after approximately 9° on an arc around the shaft 34 by the engagement of a portion of the lugs 64 with driving portions 66 of the weights 48. Thereafter, as the engine r.p.m. increases, the weights 48 will generate more centrifugal force and, in pivoting further around the points 50, will drive the cam 38 in a clockwise direction relative to the shaft 20 as viewed in FIGURE 4.

Referring now to FIGURE 5, further increase in the engine speed will cause an increasing pivotal movement of the weights 48 around the points 50 and the increasing centrifugal force will drive the cam 38 through the position as viewed in FIGURE 5. The movement of the weights 48 around the points 50 will be effectively limited by the springs 60 and the clockwise movement of the cam 38 around the shaft 20 will finally stop approximately 15° in advance of the reference line—0°. Thus, it is seen that the cam 38 has been driven by the outwardly swinging weights 48 from a —9° relative to the reference line—0°— to a +15° relative to the reference line—0°. Therefore, to summarize, the cam 38 is allowed to rotate 9° in a counterclockwise fashion relative to the shaft 20 as viewed in FIGURE 4 during an engine speed increase above 2000 r.p.m. and, at some time thereafter, approximately 3000 r.p.m. begins to move in the opposite direction a total of approximately 24° to a position as illustrated in FIGURE 5. Again, it should be noted that FIGURE 5 shows a configuration of the invention as it progresses toward 15° spark advance, the reference line 15° being illustrative of direction only.

It should be noted that the cam 38 is directly engaged through the sleeve 40 to the breaker cam 42 and that any movement generated in the cam 38 is reflected in a comparable movement of the breaker cam 42.

Referring to FIGURE 2, it is seen that movement in one direction of the breaker cam 42 relative to the rubbing block 46 of the breaker point 44 will result in a change in the timing of the opening and closing of the breaker points 44, while movement in an opposite direction by the breaker cam 42 will result in another change in timing of the opening and closing of the breaker points 44. For purposes of the example given, the range of movement in one direction is approximately 24°, illustrating a movement from 9° of spark retard to a maximum advance of the ignition timing to approximately 15°.

Utility of the present invention in the operative environment of a supercharged internal combustion engine, as previously described, is obvious as the supercharged engine is raised in speed to a point where detonation is likely to occur, for purposes of this example, determined to be 2000 to 3000 r.p.m. The engine ignition will be retarded, thereby lessening the tendency of the combustible mixture to violently explode. This retardation of the ignition spark during the critical detonation range has the effect of providing a smoother moving flame front in the combustion chamber and decreasing the adverse effect of detonation to the engine operation. At the same time, the same mechanism allows a normal spark advance to continue as the maximum efficiency range of the supercharger is passed and a normally advancing spark becomes necessary for proper engine operation.

While the embodiment of the present invention, as herein disclosed, constitutes a preferred form, it is to be understood that other forms might be adopted.

What is claimed is as follows:

1. In a supercharged engine having a speed range in which detonation is likely to occur, a spark control device comprising: plate means carried by a shaft for driving the distributor of the supercharged engine; weight means having slots formed therein and being pivotally supported on said plate means on one end and having free ends adapted to swing out from a poised position during rotation of said plate in response to centrifugal force; first cam means rotatably mounted on said shaft and having a plurality of circumferentially mounted lobes; second cam means for sequencing the spark in the distributor of the supercharged engine and mounted in fixed relationship to said first cam means and adapted to rotate therewith; spring means connecting the free end of each weight with said cam means at points spaced from said shaft and so located as to resist the effect of centrifugal force on said weights and forming a resilient connection between said plate and said cam means; including surfaces on one side of said slots held in abutting relation to some of the lobes of said first cam means by the resilient connection formed by said spring means and arranged with respect to the pivots of said weights so that on initial displacement of said weights by said force said first cam means rotates with respect to said plate in the direction of the biasing effect of said springs to effect a retardation in the ignition timing and other surfaces on said weights located on the opposite sides of said pivots and arranged so that further movement of said weights by a further increase in said force moves said surfaces against still other lobes of said first cam means and rotates said first cam means with respect to said plate against the biasing effect of said springs to effect an advance in the timing.

2. The combination of a shaft driven ignition distributor for a supercharged engine having a range of speeds during which detonation is likely to occur, and a spark control device for selectively retarding and advancing the ignition spark in the range of engine speeds where detonation is likely to occur, said spark control device comprising; a plate carried by the distributor drive shaft and adapted to rotate therewith, spring means, first cam means rotatably mounted on the distributor drive shaft, said first cam means including a plurality of outwardly extending lobes, second cam means for sequencing an ignition spark being arranged to rotate with said first cam means, and a plurality of weights having driving surfaces engaging several of the lobes of said first cam means to cause a rotation thereof and being pivotally mounted on one end to said plate and being in biased engagement to said first cam means on another end, said plurality of weights having slots adapted to allow a movement in one direction of said first cam means in response to an initial outward movement of said plurality of weights using a bias of said springs thereby effecting a retardation of the ignition spark, said plurality of weights having inwardly extending portions adapted to engage said several of the lobes of the first cam means during a later stage of outward movement of said weights to drive said first cam means against the bias of said springs in an opposite direction thereby effecting an advancing of the ignition spark.

3. The combination according to claim 1 wherein said plurality of weights have several surfaces engageable with lobes formed on said first cam means, said weights being pivotal on said plate during changes in engine speed and arranged to cam said first cam means by a force offered against the lobes of the first cam means sequentially in a first rotational direction relative to said plate during a low range of engine speeds and then in an opposite direction relative to said plate during a higher range of engine speeds, said weights moving pivotally in a single rotational direction in response to centrifugal force during the change in the rotational direction induced in said first cam means.

References Cited by the Examiner
UNITED STATES PATENTS

| | | | |
|---|---|---|---|
| 2,086,693 | 7/1937 | Arthur | 200—22 |
| 2,217,364 | 10/1940 | Halford et al. | |

FOREIGN PATENTS

| | | |
|---|---|---|
| 1,193,650 | 5/1959 | France. |
| 610,567 | 10/1948 | Great Britain. |

MARK NEWMAN, *Primary Examiner.*

RICHARD B. WILKINSON, *Examiner.*